United States Patent [19]
Imhoff et al.

[11] Patent Number: 5,481,269
[45] Date of Patent: Jan. 2, 1996

[54] GENERAL FRAME WAVELET CLASSIFIER

[75] Inventors: Scott A. Imhoff, Anne Arundel County; Martin G. Woolfson, Baltimore County; Giora A. Bendor, Howard County; Guy W. Cheesman, III; James R. Brinsley, both of Anne Arundel County; Martin M. Morici, Baltimore County, all of Md.

[73] Assignee: Westinghouse Electric Corp., Baltimore, Md.

[21] Appl. No.: 250,226

[22] Filed: May 27, 1994

[51] Int. Cl.$^6$ .................................................... G01S 13/00
[52] U.S. Cl. ........................ 342/90; 342/159; 342/162; 342/175; 342/195; 364/485; 364/487
[58] Field of Search ................................ 342/89, 90, 159, 342/162, 175, 195; 364/485, 487

[56] References Cited

U.S. PATENT DOCUMENTS

| | | | |
|---|---|---|---|
| 5,000,183 | 3/1991 | Bonnefous | 128/660.01 |
| 5,027,658 | 7/1991 | Anderson | 73/625 |
| 5,056,066 | 10/1991 | Howard | 367/72 |
| 5,124,930 | 6/1992 | Nicolas et al. | 364/485 |
| 5,247,448 | 9/1993 | Liu | 364/468 |
| 5,417,215 | 5/1995 | Evans et al. | 128/660.06 |
| 5,420,891 | 5/1995 | Akansu | 375/350 |

OTHER PUBLICATIONS

Daubechies, "Orthonormal Bases of Compactly Supported Wavelets", AT&T Bell Laboratories, pp. 911–995.
Rioul et al., "Wavelets and Signal Processing", IEEE SP Magazine, Oct. 1991, pp. 14–38.
Strang, "Wavelets and Dilation Equations: A Brief Introduction", SIAM Review, vol. 31, No. 4, Dec. 1989, pp. 614–627.
Mallet, "A Theory For Multiresolution Signal Decomposition: The Wavelet Representation", 1989 IEEE, pp. 675–693.
Rioul et al., "Fast Algorithms For Discrete And Continuous Wavelet Transforms", IEEE Transactions on Information Theory, vol. 38, No. 2, Mar. 1992, pp. 569–586.
Daubechies, "Ten Lectures On Wavelets", Rutgers University and AT&T Bell Laboratories, Society For Industrial And Applied Mathematics, Philadelphia, Pa., 1992, pp. 1–104.
Grossmann et al., "Decomposition Of Hardy Functions Into Square Integrable Wavelets Of Constant Shape", SIAM J. Math. Anal., vol. 15, No. 4, Jul. 1984, pp. 723–736.

*Primary Examiner*—J. Woodrow Eldred

[57] ABSTRACT

A classifier employing general frame wavelets for improving target recognition while decreasing computational intensity is disclosed. A wavelet selection means compares a portion of a time dependent input signal from a receiver with a set of sample wavelets, each wavelet being bandpass limited, locally supported, and mean zero, and selects a prototype wavelet resembling the input portion. A resolving means expands the prototype wavelet onto a basis of wavelet functions having variations in scale and delay, and resolves the input signal onto the basis of functions. A regionpass filter identifies a region from a grid of resolved coefficients that contains features of a target from the input signal and discards coefficients outside the region. A separability filter passes select coefficients from a scale band within the identified region where separability among known targets is high. A comparator compares the selected coefficients with an exemplar of known targets to indicate a recognition of the target.

32 Claims, 10 Drawing Sheets

GENERAL FRAME WAVELET CLASSIFIER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to classifiers to of objects embedded in received advanced sensor signals and more particularly to radar classifiers for recognizing targets obscured by noise, scintillation, and clutter occurring in returned radar signals.

2. Discussion of Related Art

Many technologies share a common problem: data, as first received by a sensor, is typically difficult to interpret in its received form and must be processed using transforms and filters. The processing renders a new representation that lays bare salient features in order to allow classification of application-important objects. Often these transforms involve expanding the sensor data onto an analysis basis of functions spanning Hilbert space. For example, in pulse Doppler radar, a moving target that is obscured by ground clutter may be separated from ground clutter by performing a Fourier transform. The transform shifts in frequency the target out of the portion of the Doppler spectrum occupied by the clutter and into a clutter-clear region. The target may then be extracted by appropriate filtering in the Fourier domain. The filter number of the Fourier filter containing the target energy is then an indication of the target velocity, and thus partial classification information.

Use of the Fourier transform effects a supposition that the sensor data may be aptly represented as a superposition of sinusoids. In many sensor applications (e.g., pulse Doppler radar) the use of sinusoids is fruitful; however, in numerous other important instances the Fourier representation is cumbersome (e.g., coefficient-intensive when representing sharp features) or fails altogether to yield an interpretable representation (e.g., resolution of multiple superposed FM signals). Moreover, the Fourier method does not exploit the opportunity to allow a priori information about sensor and target to figure in the design of the analysis basis for the transform. Often the impulse response of the data, the nature of the target and its location and other physics of the sensor target classification problem are known. Ignoring this known information when selecting an analysis basis for the transform, and perfunctorily using the Fourier method, often results in complex and/or impenetrable sensor data representations.

Many objects of interest for classification occurring in sensor data have attribute or compact support; they have short duration (i.e., non-stationary signals). Prior art has attempted to exploit the compact support in such applications by applying a compact window to the Fourier kernel to implement a windowed Fourier transform. While useful for certain applications, typically, these windowed Fourier transforms are not reversible transforms. As a result, inadvertent loss of information and/or introduction of artifacts may occur, which may be pernicious for classification applications.

SUMMARY OF THE INVENTION

Accordingly, the present invention is directed to a classifier that substantially obviates one or more of the limitations and disadvantages of the described prior arrangements.

Additional advantages of the invention will be set forth in the description that follows, and in part will be apparent from the description, or may be learned by practice of the invention. The advantages of the invention will be realized and attained by the apparatus particularly pointed out in the written description and claims hereof as well as the appended drawings.

To achieve these and other advantages and in accordance with the purpose of the invention, as embodied and broadly described herein, the invention comprises a classifier for recognizing features of a target in a received signal comprising means for selecting a prototype wavelet corresponding in amplitude and phase per unit of time to a portion of the received signal, and means for resolving the received signal onto a basis of wavelet functions in a wavelet domain by calculating inner product transform coefficients between the received signal and each of the wavelet functions, the wavelet functions corresponding to variations in scale and delay for the prototype wavelet, the variations in scale and delay exceeding a frame condition for the prototype wavelet and the basis, the frame condition enabling an inverse wavelet transform of the calculated inner product transform coefficients to converge on the received signal. The classifier further comprises a regionpass filter for identifying a target region of the basis and for passing the inner product transform coefficients within the target region, the target region including the target features in the received signal; a separability filter coupled to the regionpass filter for passing select inner product transform coefficients in the target region, the select inner product transform coefficients occurring in a scale band within the target region and having a separability between known targets exceeding the separability in other scale bands within the target region, a scale band defined by a set of inner product transform coefficients having a common scale variable. The classifier of the present invention further comprises a comparator coupled to the separability filter for comparing the select inner product transform coefficients to an exemplar, the comparison indicating a recognition of the features of the target.

In another aspect, the invention comprises a method for classifying features of a target in a received signal, comprising the steps of selecting a prototype wavelet corresponding in amplitude and phase per unit of time to a portion of the received signal; resolving the received signal onto a basis of wavelet functions in a wavelet domain by calculating inner product transform coefficients between the received signal and each of the wavelet functions; identifying a target region of the basis, the target region including the target features in the received signal; passing the inner product transform coefficients within the target region; passing select inner product transform coefficients in the target region; and comparing the select inner product transform coefficients to an exemplar, the comparison indicating a recognition of the features of the target.

It is understood that both the foregoing general description and the following detailed description are exemplary and explanatory and are intended to provide further explanation of the invention as claimed.

The accompanying drawings, which are incorporated in and constitute a part of this specification, illustrate several embodiments of the invention and together with the description serve to explain the principles of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Like sinusoids used in a Fourier transform, wavelets provide a medium for transforming a signal into an alternative representation. The wavelet transform, however, can represent a signal in a form that permits easier extraction of the crucial target features for compactly-supported target signals, or where a priori information concerning the sensor-target physics is available, or where target and background clutter behave differently as a function of scale. Wavelets, unlike sinusoids, can be tailored to suit the application based on a priori knowledge. For a high range resolution radar application in particular, owing to the localization in time and frequency, use of a wavelet transform and a regionpass filter in processing received signals enhances recognition of target signatures. Moreover, performing a wavelet transform at a critical frame together with regionpass filtering vastly decreases the computational intensity for target recognition.

In accordance with the present invention, a classifier for the purpose of recognizing features of a target in a received signal comprises means for selecting a prototype wavelet, means for resolving the received signal onto a basis of wavelet functions in a wavelet domain, a regionpass filter, a separability filter, and a comparator.

Figure 1:
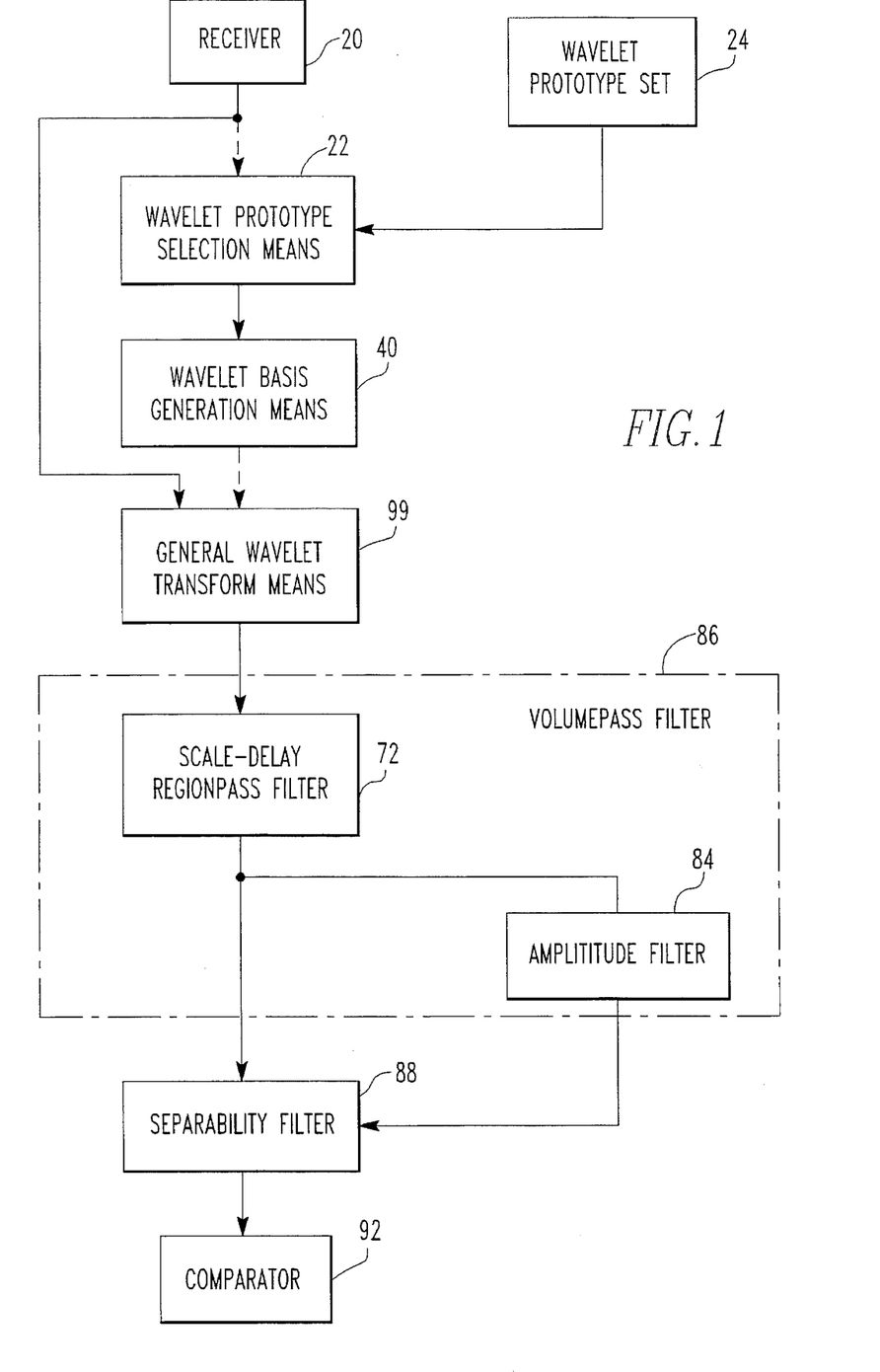
FIG. 1 is a block diagram of a general frame wavelet classifier according to the present invention.
Figure 2:
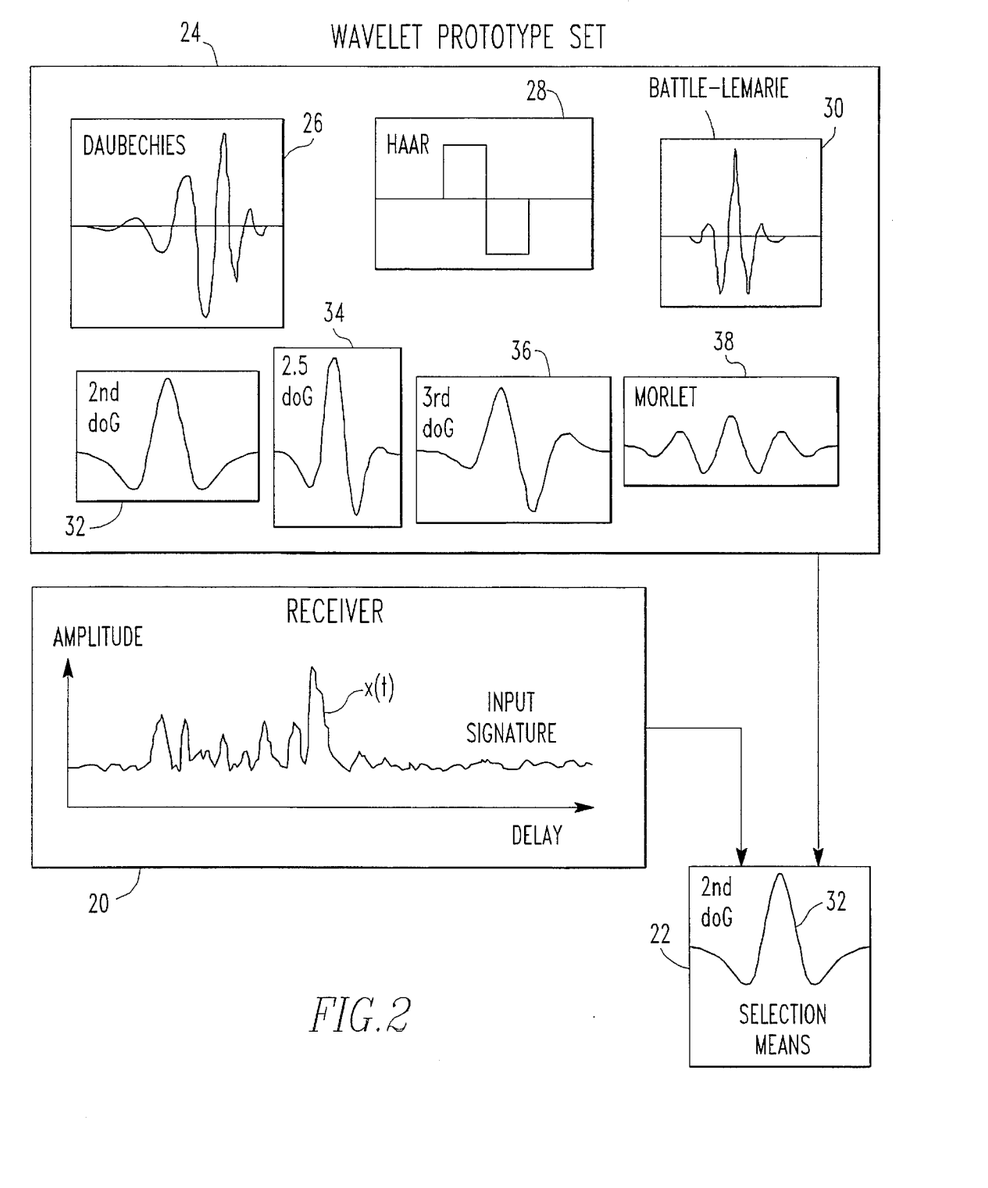
FIG. 2 is a block diagram of a wavelet selection process of a classifier according to the present invention.
Figure 3:
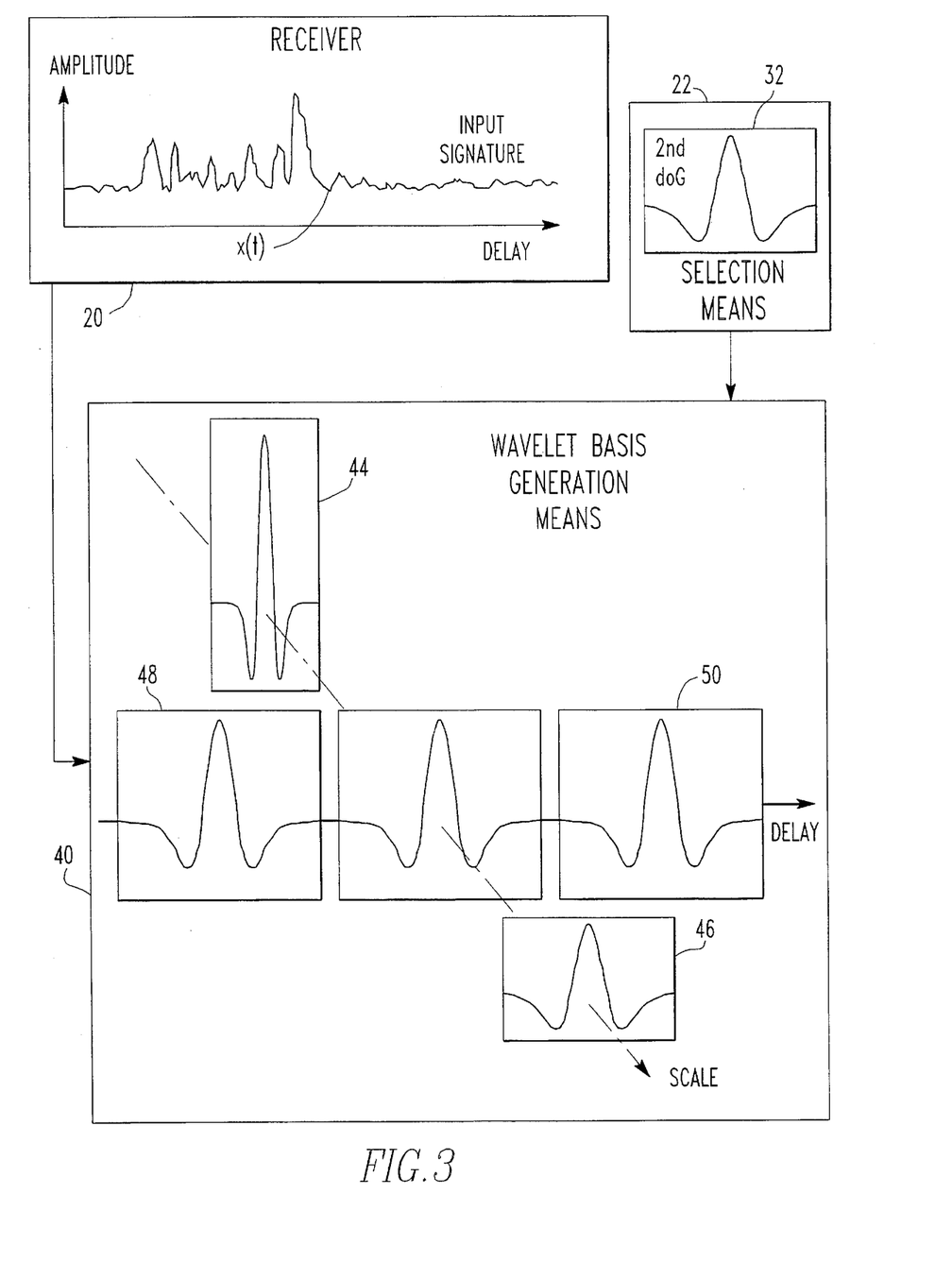
FIG. 3 is a block diagram of a resolving process of a classifier according to the present invention.

As herein embodied and illustrated in FIGS. 1-3, a receiver 20 provides an input signal $x(t)$, which may be complex or real, to the present invention. The input signal $x(t)$ comprises a variation in amplitude and possibly phase in a time domain. Typically, the input signal $x(t)$ is a received electromagnetic signal such as a high range resolution signal reflected off a target and absorbed by an antenna (which may also be the transmitter). Other initial sources for the received signal $x(t)$ may include a fingerprint identification device or medical diagnostic equipment, for example. The signal $x(t)$ typically contains information stored inherently in its frequency (e.g., sharpness of features), phase (for non-zero imaginary component), amplitude and time delay (if non-stationary). For a radar application, the received signal $x(t)$ character is determined by the sensor-target aspect geometry, the physical details of the shape of the target that are larger than a quarter wavelength, the dielectric properties of the target, background clutter, interference, and receiver noise. These combined waveforms may yield, for example, a received signal $x(t)$ characterized by compact support and obscured by noise and clutter, as shown in FIGS. 2 and 3.

For use in transforming the received signal $x(t)$ from the time domain to the wavelet domain, the present invention stores a sample set of prototype wavelets 24. As is commonly known in the art, each prototype wavelet 24, referred to as $h(t)$, is at least mean zero ($\int h(t)dt=0$), belonging to Hilbert space ($\int |h(t)|^2 dt < \infty$), and locally supported in the input and Fourier domains. In addition to these essential requirements, $h(t)$ may also be complex 38, symmetric 30 and 32, and it may enjoy strict compact support 26 and 28. Commonly used prototype wavelets 24 that do meet the admissibility condition include Daubechies 26, Haar 28, Battle-Lemarié 30, the second derivative of Gaussian (doG) 32, 2½ dog 34, 3rd dog 36, and Morlet 38. As explained below, the Daubechies 26, Haar 28, and Battle-Lemarié 30 wavelets are all orthonormal, while the 2nd dog 32, 2½ dog 34, 3rd dog 36, and the Morlet 38 wavelets are all general frame. It will be readily apparent to those skilled in the art that numerous other sample wavelets, both orthonormal and general frame, are available for use with the present invention.

As depicted in FIGS. 1 and 2, a selection means 22 compares a portion of the received signal $x(t)$ to the sample wavelet set 24. The sample wavelet $h(t)$ having the greatest similarity or correlation with the portion of the received signal $x(t)$ is selected as a prototype wavelet $h(t)$. The similarity or correlation is generally based upon an inner product comparison made between each candidate prototype wavelet 24 and a portion of the received signal $x(t)$, the comparison being made in either the time or frequency domains. As exemplified in FIG. 2, the 2nd dog wavelet 32 presents the closest match to the received signal $x(t)$ that comprises sinc function-shaped target features imbedded in noise, and is therefore chosen by selection means 22. The selection means 22 may comprise an inner product labeled with delay between the received signal $x(t)$ and a candidate prototype from 24, labeled with scale. The selection means may also involve location of the apparent target within $x(t)$ via energy centroid and extraction of a portion of $x(t)$ containing the apparent target by the inner product with a candidate prototype from 24.

After the selection means 22 selects the prototype wavelet h(t), a wavelet basis generation means 40 then generates a basis of wavelet functions that span Hilbert space by labeling a the wavelet prototype h(t) with scale and delay labels. If the scale label is denoted $\alpha$ and the delay label is denoted $\tau$, then a wavelet basis generation means 40 essentially makes a substitution $\longrightarrow$;(t-$\tau$)/$\alpha$ in the wavelet prototype h(t). Additionally, normalization is achieved by multiplication by $1/\sqrt{a}$. Thus the wavelet basis generation means 40 replaces h(t) with:

$$h_{\alpha,\tau}(t) = (1/\sqrt{\alpha})h((t-\tau)/\alpha).$$

In contrast to a Fourier basis, in which the prototype is labeled with one label (frequency), the wavelet basis has two labels, scale and delay. Additionally, the scale and delay labels as applied provide that constant shape is preserved. Each wavelet function in the basis varies from the prototype wavelet by a magnitude of scale and/or delay but each has the same number of oscillations at each scale-delay coordinate and the same, constant, self-similar shape. As explained in more detail below, the magnitude of the variations in scale and delay from scale to scale and from delay to delay that are applied via the wavelet basis generation means 40 must satisfy a frame condition that depends upon the prototype wavelet h(t) selected.

Referring to FIG. 3, the 2nd dog prototype wavelet 32 labeled with scale and delay to generate a wavelet basis results in contracted 2nd doG wavelets 44 at small scale and dilated 2nd dog wavelets 46 at large scale on a scale axis. Likewise, at each scale, low delay replicas of the 2nd dog appear at early times 48 and large delay replicas appear at later times 50 on a delay axis. Despite the contraction, dilation, or delay, the labeled wavelets 44, 46, 48, and 50 all maintain the constant, self-similar shape of the 2nd dog prototype 32. FIG. 3 shows only a few example wavelets from a wavelet basis; in actual implementation, the number of wavelets in the basis will equal or exceed the number of data in the input sequence x(t). While the wavelet prototypes are subject to an aforementioned admissibility condition, the permissible step sizes in scale $\alpha$ and delay $\tau$ implemented by the wavelet basis generation means 40 and thus the allowed indices $\alpha$ and $\tau$ in $h_{\alpha,\tau}(t)=(1/\sqrt{a})h((t-\tau)/\alpha)$ must satisfy a frame condition which depends on the prototype wavelet h(t) selected.

The wavelet basis generation means 40 employs a limited number of input vectors of training data $x_i(t)$ in order to determine an appropriate prototype wavelet and then to generate the corresponding labeled basis of wavelets. This is an initialization procedure or a calibration of the classifier; once the training data have been analyzed by wavelet basis generation means 40 and a wavelet basis determined, the wavelet basis is set for future processing of data. New incoming, non-training vectors of data $x_k(t)$ bypass the wavelet basis generation means 40, as shown in FIG. 1, and are input to the general wavelet transform means 99 and from there proceed to classification in the wavelet domain.

After an appropriate wavelet basis has been generated, subsequent input data x(t) is presented immediately to general wavelet transform means 99, which expands the input data onto the basis of wavelets. This is accomplished by taking an inner product between the input function and each wavelet basis function $h_{\alpha,\tau}(t)$. Each inner product produces a complex scalar, referred to as an inner product transform coefficient, corresponding to a particular scale-delay coordinate at which $h_{\alpha,\tau}(t)$ assumed its indices. The specific transform occurring in the general wavelet transform means 99, which generates each inner product transform coefficient, is:

$$\text{inner product } (\alpha, \tau) = [x(t), h_{\alpha,\tau}(t)]$$
$$= \int x(t) h_{\alpha,\tau}*(t) dt$$

The increments in scale between adjacent scales $\alpha_i, \alpha_{i+1}$ and the increments in delay between adjacent delay $\tau_i, \tau_{i+1}$ are set to satisfy the aforementioned frame condition for the chosen admissible wavelet prototype by the wavelet basis generation means 40. The achievement of admissibility and frame provides for the subsequent general wavelet transform means 99 to effect a reversible representation of the received signal x(t) in the wavelets domain, where it manifests as a function of two independent variables $\alpha$ and $\tau$:

$$\text{inner product } (\alpha, \tau) = [x(t), h_{\alpha,\tau}(t)]$$
$$= \text{Wavelet Transform } (\alpha, \tau)$$

The general wavelet transform means 99 together with the wavelet basis generation means 40, if necessary, comprise a resolving means.

Figure 4:
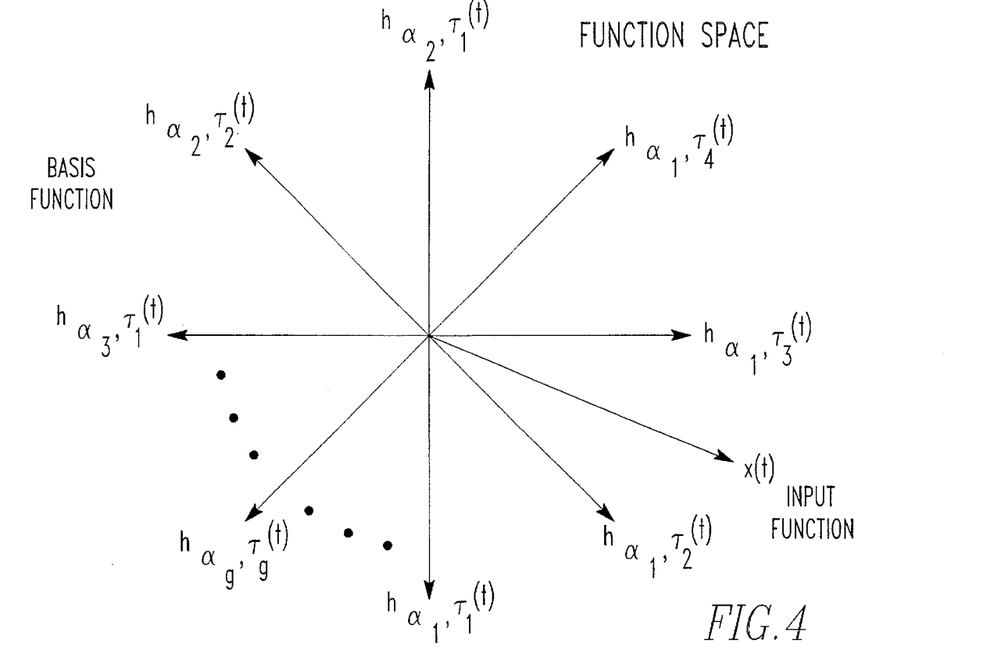
FIG. 4 is a plot of an input function and its basis functions in Hilbert space for use with the present invention.

FIG. 4 further illustrates the function of general wavelet transform means 99. As provided in the wavelet prototype selection means 22 and the wavelet basis generation means 40, the basis $h_{\alpha,\tau}(t)$ determined for the general wavelet transform means 99 spans function space (Hilbert space L2, the space of square integrable complex-valued functions of a real variable). The input signal x(t) is resolved onto the basis by taking an inner product between the input function x(t) and each basis function $h_{\alpha,\tau}(t)$. The inner product measures the similarity of each basis function $h_{\alpha,\tau}(t)$ to the input function x(t) in the "direction" of each basis function $h_{\alpha,\tau}(t)$.

Figure 5:
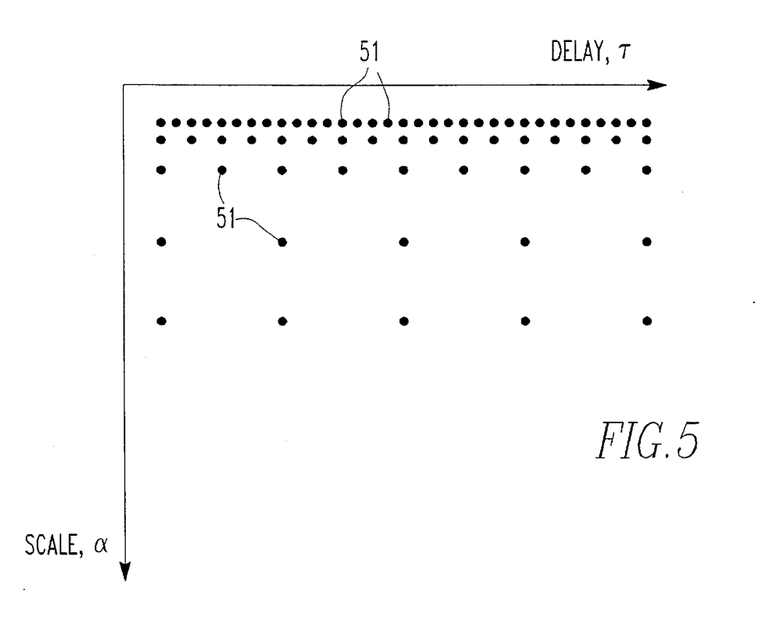
FIG. 5 is a plot of inner product transform sites arranged in scale-delay at which inner product transform coefficients are calculated in a wavelet domain according to the present invention.

FIG. 5 illustrates the grid of $\alpha,\tau$ sites, each dot representing a pair of $\alpha,\tau$ coordinates that the $h_{\alpha,\tau}(t)$ assumes as indices for the inner products. Therefore, the number of sites on such a grid is equal to the number of inner product transform coefficients generated by general wavelet transform means 99 in order to represent the input signal x(t) in the wavelet domain, The appearance of the grid in FIG. 5 is owing to the use of general frame wavelets in general wavelet transform means 99. Since orthonormality is not imposed, in order to allow more freedom to tailor the wavelet shape in the wavelet prototype selection means 22 to match the application, the grid is not necessarily diadic. Scale and delay spacings $\alpha=a_o^m$ and $\tau=b_o a_o^{m-1}$ with m running through the integers and $a_o \leq 2$ may be used in reversible transforms provided the Daubechies frame condition is met:

$$A \|x(t)\|^2 \leq \sum_{\alpha,\tau} |[x(t), h_{\alpha,\tau}(t)]|^2 \leq B \|x(t)\|^2$$

For $A>0$, $B<\infty$ The above is a generalization of Parseval's equation. In the special case of an orthonormal basis, the frame condition is met with unity bounds (a=B=1), yielding $$\sum_{\alpha,\tau} |[x(t), h_{\alpha,\tau}(t)]|^2 = \|x(t)\|^2$$

which is Parseval's equation. In this orthonormal case, the grid of FIG. 5 would be diadic.

To ensure proper resolution of the received signal x(t) into the wavelets domain, the variations in scale and delay for the wavelet functions must satisfy the frame condition, a generalization of Parseval's equation. The frame condition dictates, for a given prototype wavelet h(t) and a basis composed of its labeled replicas, the number of inner product transform coefficients necessary in order to provide for a reversible representation. That is, the frame condition ensures that an inverse wavelet transform of the inner product coefficients will converge on the received signal x(t), otherwise known as resolution of the identity or, $WT^{-1}(WT(x(t)))=x(t)$. The vital importance of meeting the frame condition and providing for a reversible transform ensures that no information is either inadvertently lost or that artifacts are not unintentionally introduced during the forward or inverse transform. Naturally, the frame condition depends upon the selected prototype wavelet h(t) from the sample wavelet set 24.

When a number of the inner product calculations necessary to achieve a reversible representation of the input signal x(t) is a minimum, the variations for scale and delay for the prototype wavelet h(t) is called critical frame. An inverse wavelet transform on a number of coefficients less than critical frame will not converge on the input function. In reference to FIG. 5, critical frame will occur at a select density for the scale-delay grid of inner product sites, the number of inner product sites being equal to the number of inner product transform coefficients. As discussed below, resolution of the received signal x(t) into the wavelet domain at critical frame reduces the computational intensity required to discriminate or detect target signatures.

The wavelet basis generation means 40 determines the critical frame condition for the selected prototype wavelet h(t). In order to tie the grid spacing to a single parameter, the wavelet basis generation means 40 places the wavelet basis on a powers of m scheme that yields: $h_{m,n}(t)=(1/\sqrt{a_o^m})h(t/a_o^m-nb_o)$ where m,n are integers that represent scale octave and delay index for the wavelet domain, $b_o$ is a real constant, and a is a variable that affects the coefficient grid density. For example, for a 2nd dog prototype wavelet where $h(t)=(1-t^2)e^{-\frac{1}{2}t^2}$ the basis of wavelet functions becomes:

$$h_{m,n}(t) = (1/\sqrt{a_o^m})(1-(t/a_o^m-nb_o)^2)e^{-1/2(t/a_o^m-nb_o)^2}.$$

Both general-frame wavelets and orthonormal wavelets must meet the aforementioned frame condition, a generalized Parseval's equation, in order to secure the vitally important reversibility that preserves information and prohibits artifacts during transform. The orthonormal basis meets the frame condition with unity bounds and a diadic grid. Meeting frame at its critical grid density for the general frame case is non-trivial since the generalized Parseval's equation cannot be used directly to determine the grid spacing since it calls for testing all possible functions x(t) in Hilbert space. The present solution to this problem that circumvents the need to test all functions in Hilbert space L2, centers on an algebra of sets presented in FIG. 6. Wavelet bases functions and received signals x(t) must be Hilbert L1 in order for the inner product kernels to be normed in Banach space L1. The space of continuous functions is an open space since it does not contain its limit points, hence the dashed line in FIG. 6. The function $y_n(t)$ is a continuous function and occurs within the dashed region in FIG. 6. The limit of $y_n(t)$ as n becomes arbitrarily large, the Heaviside function, is an L2 function; however, it is discontinuous and outside the dashed region of FIG. 6. Thus step functions, square waves, and other discontinuous functions compose the outer edges of L2 and are difficult to reconstruct in the resolution of the identity $WT^{-1}(WT(x(t))=x(t)$. Rather than test all functions x(t) in Hilbert space L2, a discontinuous function is used to set the general frame grid at critical frame. If the discontinuous function converges, the incoming x(t) will be reversibly represented.

Figure 6:
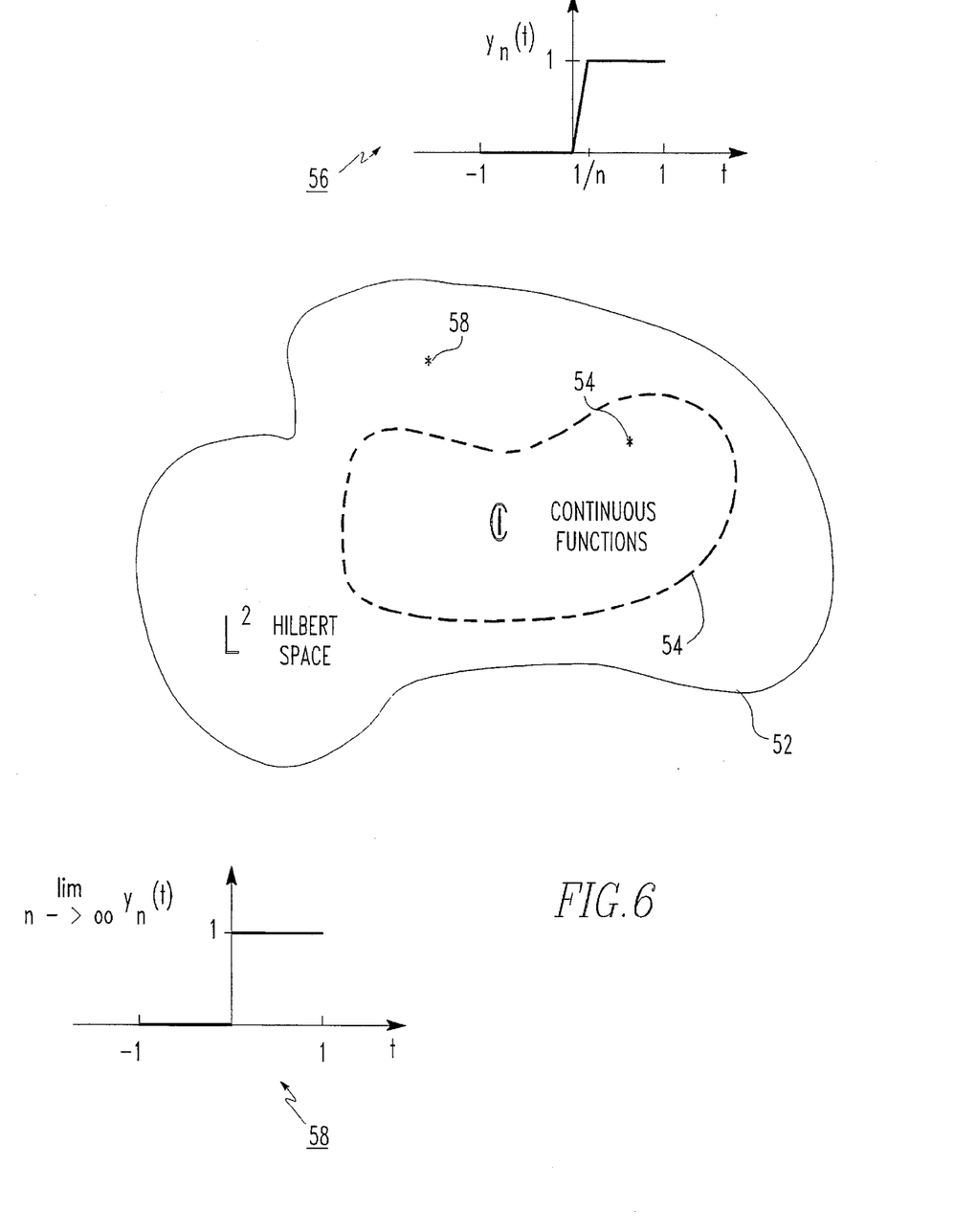
FIG. 6 is a diagram of a ramp function and its limit, a Heaviside function, for use with the present invention.

The wavelet basis generation means 40 of the present invention determines the critical frame for the prototype wavelets labeled replicas using a representative test signal y(t) as the received signal x(t). As herein embodied, the representative test signal is a non-continuous function within a complement of a space of continuous functions within Hilbert space. As illustrated in FIG. 6, the set of continuous functions 54 is a subset within Hilbert space 52. A ramp function 56, $y_n(t)=(1/n)t$, is continuous within the set 54. As n approaches infinity, however, the continuous ramp function becomes a non-continuous Heaviside function 58, or square wave, inside Hilbert space 52 but outside set 54. Because an inverse transform of a square wave will not converge as readily as an inverse transform of a continuous function, the square wave presents an optimal choice for the representative test signal y(t) when determining critical frame. It will be readily apparent to those skilled in the art that other non-continuous functions within Hilbert space, such as a Heaviside function or a Dirac delta, will serve well as representative test signals when determining critical frame.

Figure 7:
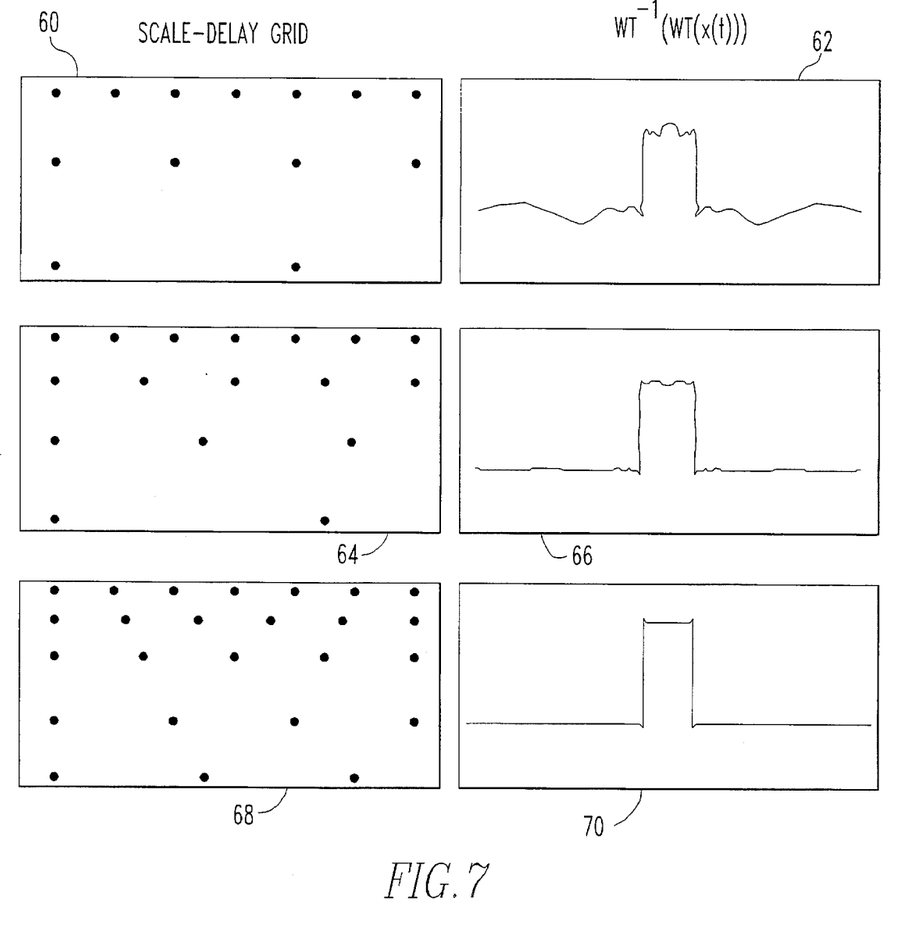
FIG. 7 is a diagram of a scale-delay grid and an inverse wavelet transform near critical frame according to the present invention.

Referring to FIG. 7, the wavelet basis generation means 40 takes an inverse wavelet transform of a square wave input using a 2nd dog prototype wavelet 32. The 2nd doG prototype wavelet 32 presents a suitable replacement for the impulse response sinx/x, the potentially ideal prototype wavelet for a radar application. The impulse response sinx/x does not satisfy the admissibility condition that $\int h(t)\, dt=0$. The 2nd dog function 32, on the other hand, does meet the admissibility condition and has a similar shape to the impulse response. In FIG. 7, when $a_o>5$, the resulting scale-delay grid 60 from the wavelet transform is sparse. Consequently, the inverse wavelet transform 62, also referred to as $WT^{-1}(WT(x(t))$, does not converge on the square wave, and critical frame is not achieved. When $a_o$ approaches 2, the number of coefficients in the resulting scale-delay grid 64 increases, but the inverse wavelet transform 66 still does not converge. At $a_o=1.4$, the inner product transform coefficients in the scale-delay grid 68 reach a density such that the inverse wavelet transform 70 does converge on the square wave. One skilled in the art will recognize that similar calculations for representative test signals y(t) other than the square wave and for prototype wavelets h(t) other than 2nd doG will likewise yield critical frame for the present invention.

The classifier of the present invention further comprises a regionpass filter 72 for identifying a target region within the basis of wavelet functions and for passing the inner product transform coefficients within the target region. The target region is a portion of coefficients within the scale-delay grid that includes the features of a target from the received signal x(t).

Figure 8:
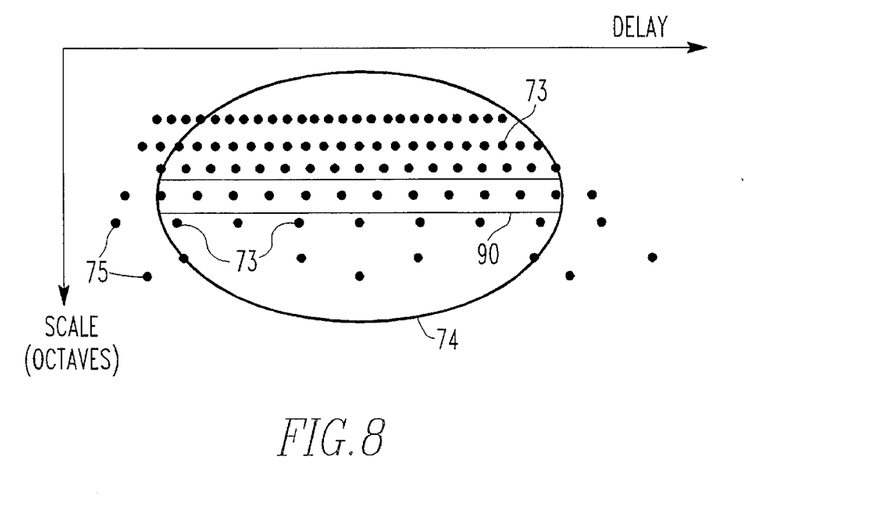
FIG. 8 is a plot of a regionpass filter boundary in a scale-delay plane according to the present invention.

As herein embodied and illustrated at FIG. 8, a regionpass filter 72 sets a boundary 74 to outline a sample region of the scale-delay grid. The regionpass filter 72 correlates inner product transform coefficients 73 inside the boundary 74 with inner product transform coefficients 75 outside the boundary 74. Although the regionpass filter 72 preferably performs a Pearson's r correlation, analogous methods for comparing the coefficients such as least squares, Chi-squared, or Bayes error will suffice. After obtaining a correlation for coefficients inside and outside the boundary 74, the regionpass filter 72 shifts the location of the boundary 74 and adjusts the size of the boundary 74 while performing additional correlations. The optimal location and size of the boundary 74 occurs where the correlation is least, i.e., where the coefficients 73 inside the boundary are the least similar to the outer coefficients 75. This optimal location and size of the boundary 74 corresponds to the area in the scale-delay plane where the essential target features reside.

Figure 9:
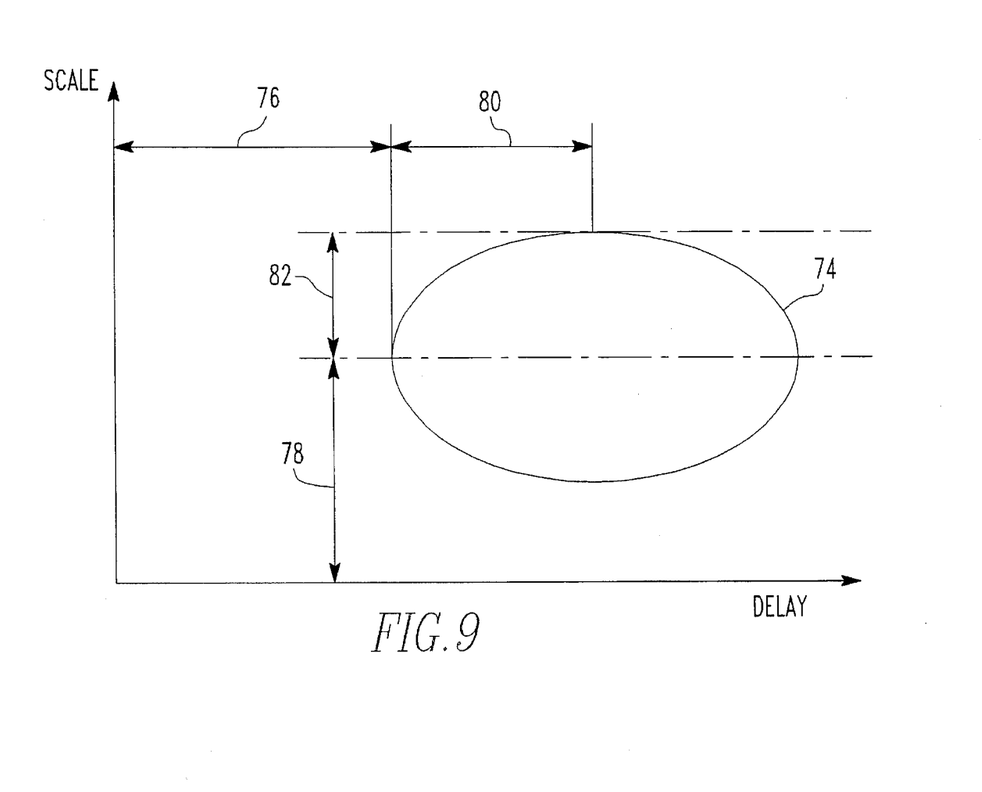
FIG. 9 is a diagram of an ellipsoidal boundary for a regionpass filter in a scale-delay plane according to the present invention.

More particularly, the regionpass filter 72 first selects a shape for the boundary 74. Preferably the boundary 74 is an ellipse, as illustrated in FIGS. 8 and 9 due to its width along the delay axis. Alternatively, the regionpass filter 72 may use other shapes for the boundary such as a circle or any simple closed curve or union of simple closed curves. Together with shifting the location of the boundary 74 in the scale-delay plane, the regionpass filter 72 adjusts the size of the boundary 74. For an ellipse, the regionpass filter 72 tunes several parameters of the boundary geometry, such as an ellipse delay offset 76, an ellipse scale offset 78, a major axis length 80, and a minor axis length 82, as shown in FIG. 9. The ellipse delay offset 76 and ellipse scale offset 78 variables control the boundary's location in the scale-delay plane. Likewise, the major axis length 80 and minor axis length 82 control the boundary's size. By adjusting these parameters and correlating the inside coefficients 73 with the outside coefficients 75, the regionpass filter 72 determines the precise size and location for the ellipsoidal boundary 74 such that the target features are enclosed.

Figure 10:
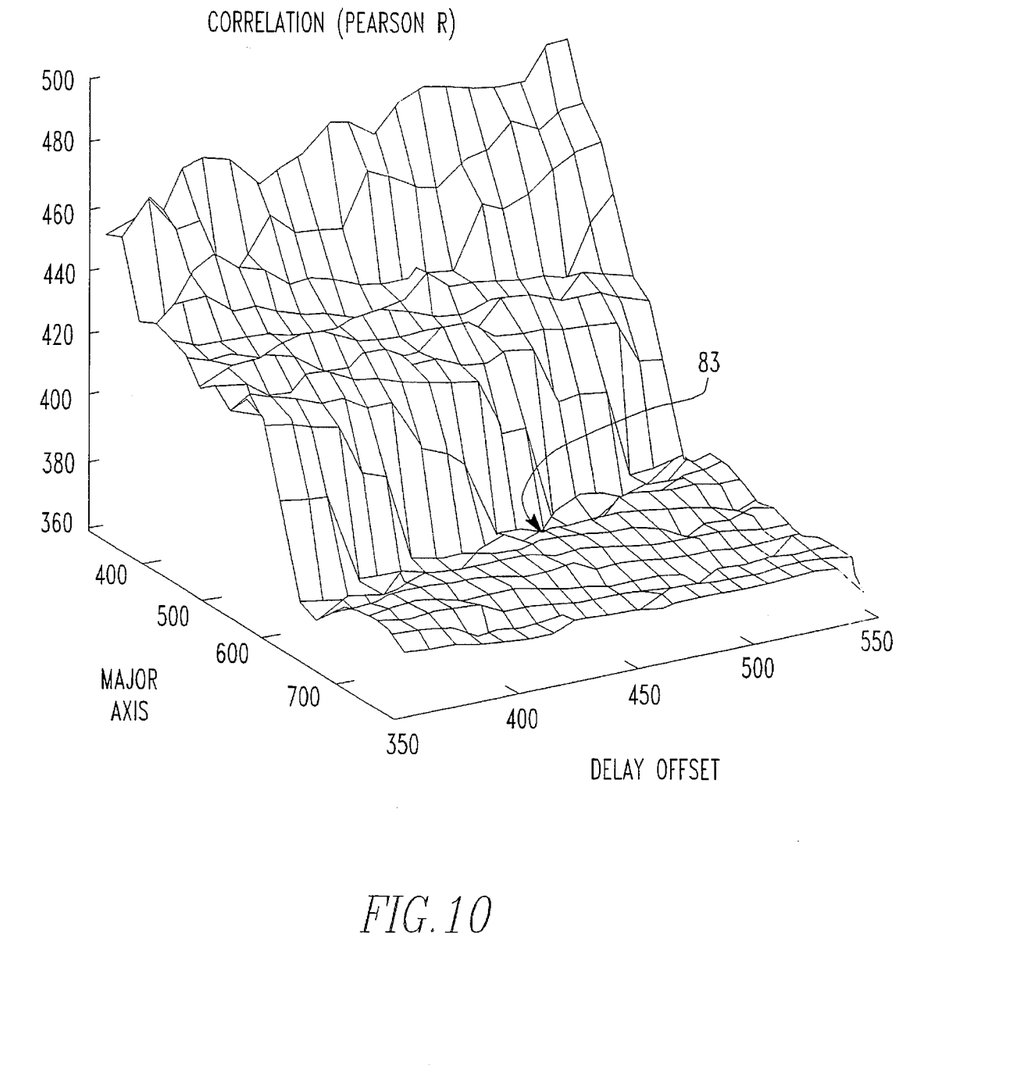
FIG. 10 is a plot of a Pearson's r correlation versus pass region geometry for a regionpass filter boundary shown in FIG. 9.

Referring to FIG. 10, the regionpass filter 72 performs a Pearson's r correlation while varying the boundary parameters two at a time. Ellipse delay offset 76 and major axis length 80 of FIG. 9 were varied and a minimum correlation 72 was identified in FIG. 10. After repeating the correlations while adjusting other boundary parameters two at a time, the regionpass filter 72 can identify the region 74 in the scale-delay plane of FIGS. 8 and 9 where the target features reside.

After identifying the target region, the regionpass filter 72 passes the inner product transform coefficients 73 within the boundary 74 and discards the remaining coefficients 75. An amplitude filter 84 that further passes only a portion of the inner product transform coefficients selected by the regionpass filter 72 may be appended to the regionpass filter. If used, the amplitude filter 84 will help eliminate unwanted noise by passing only those coefficients having a magnitude in excess of a predetermined value. The combination of the regionpass and amplitude filters 72 and 84 will make a volumepass filter 86 for the present invention.

In accordance with the present invention, the classifier further comprises a separability filter coupled to the regionpass filter. As embodied in FIG. 1, the separability filter 88 analyzes stored inner product transform coefficients from known targets in conjunction with the target region passed by the regionpass filter 72.

As shown in FIG. 8, the target region within the boundary 74 contains inner product transform coefficients arranged in rows or scale bands such as 90. Each inner product transform coefficient within a scale band has a common scale variable. The separability filter 88 refers to stored inner product transform coefficients from known targets and performs a correlation between the known targets at each of the-scale bands. For example, in a radar application a particular target will return electromagnetic signals at a distinct range of amplitudes, time-delays, frequencies, phases, and polarizations based at least on the target's physical structure, e.g., the presence of corner reflectors such as where an aircraft wing meets a fuselage or where blades rotate, the surface dielectric properties, target location and velocity. By receiving a target's returns and processing them using a wavelet transform, the present invention can obtain and store a distinct set of inner product transform coefficients, i.e. a signature or exemplar, for that target. The scale band having the lowest correlation between these known targets corresponds to the scale band 90 with the highest separability. Consequently, the separability filter 88 passes the inner product transform coefficients within that scale band 90 that has high separability between targets and discards all other coefficients. Clearly, separability filter 88 may pass a scale band having less than the highest separability among known targets and still achieve the goals of the present invention.

The combination of the selection means, the resolving means, the regionpass filter, and the separability filter in the present invention can serve independently as a preclassifier. Functioning as a preclassifier, the present invention may supply the inner product transform coefficients of the scale band 90 directly to a separate classifier such as a hidden layer back propagation neural net, restricted channel neutral net, adaptive critic, or a linear classifier for processing. If the dimensionality of the scale band 90 is higher than desired for the separate classifier, the extracted or select coefficients of scale band 90 may be re-expanded onto the basis of wavelets to form a filtered signal $x_1(t_j)$. In other words, the resolving means may perform an inverse wavelet function on the extracted coefficients to produce a filtered signal in the time domain. This filtered signal $x_1(t)$ may then be processed following conventional classifying techniques or again submitted to the wavelet transform of the present invention.

The wavelet basis generation means 40, general wavelet transform means 99, regionpass filter 72, and separability filter 88 may be implemented in one form in a standard signal processing computer using variants of the following Fortran 77 program for a 2nd dog prototype wavelet with an ellipsoidal boundary 74.

---

EXAMPLE FORTRAN 77 IMPLEMENTATION
Copyright 1993 Westinghouse Electric Corporation
All Rights Reserved

---

```
c     Notes: Prototype wavelet is negative second derivative of a
c     Gaussian (Second doG):
c
c
c     h(t) = (1 – t²)e^(–½t²)
c
c     This prototype was labeled with alpha and tao as follows
c
c
c     h(t) → (1/√alpha )(t – tao/alpha)
c
c     In turn, alpha and tao are relabeled as:
c
c     alpha = a0**m
c
c     tao = n*b0*(a0**m)
c
c     Here we use a0 = 1.4 and b0 = 1/1.4
c     Which is near the edge of the frame condition.
c     Or as desired: frame is adjustable
      character*20 input_file
      complex    x1(812)
      complex x_cmp_in(816),j,FT(816),jomega,WN
```

EXAMPLE FORTRAN 77 IMPLEMENTATION
Copyright 1993 Westinghouse Electric Corporation
All Rights Reserved

```
        real    f(2048), diff(2048)
        real    h(816,3000),rl,im,step_size(38)
        real    x(816),x_in(816),x_rl_in(816)
      integer limit(38),grid
      integer s,o,r
        real    wt(816,38)
c     Step 1. Initialize array, enter data.
      print *,'Enter name of input_file =>'
      read(5,100) input_file
      print *,'Enter data length=>'
      read(*,*) N_1
      print *,'Enter amplitude factor =>'
      read(*,*) factor
      print *,'Ellipse information :'
      print *,'*********************'
      print *,' '
      print *,'Enter xoff ==>'
      read(*,*) xoff
      print *,'Enter yoff ==>'
      read(*,*) yoff
      print *,'Enter a    ==>'
      read(*,*) a
      print *,'Enter b    ==>'
      read(*,*) b
      do m = 1, 38
        do n = 1, N_1+4
      wt(n,m) = 0.0
        enddo
      enddo
      open(unit=11,name=input_file)
      print *,'Enter a0 ==>'
      read(*,*) a0
      b0 = 1./a0
      do i = 1, 406
           read(11,200) x_rl_in(i)
           print *,i,'x_rl_in(i) = ',x_rl_in(i)
      enddo
      do i = 1, 203
        rl = x_rl_in(2*i-1)
        im = x_rl_in(2*i)
        x_cmp_in(i) = cmplx(rl,im)
      enddo
      j = (0.0,-1.0)
      pi = 3.141592654
      do k = 1, 203
        if(mod(k,25).eq.0)print *,k,' 203 inverse DFT'
        FT(k) = (0.0,0.0)
        do n = 1, 203
          jomega = j*pi*2.*n*k/203.
          WN = cexp(jomega)
          FT(k) = FT(k) + x_cmp_in(n)*WN
        enddo
      enddo
      do n = 1, 812
        x_cmp_in(n) = (0.0,0.0)
        print *,n,'   812 forward DFT'
        do k = 1, 812
          jomega = -1.0*j*pi*2.*n*k/812.
          WN = cexp(jomega)
          x_cmp_in(n) = x_cmp_in(n) + FT(k)*WN
        enddo
      enddo
      print *,'enter wt_thresh'
      read(*,*) wt_thresh
        do i = 1, N_1
          rl = real(x_cmp_in(i))
          im = imag(x_cmp_in(i))
          x(i) = 30.*sqrt(rl**2+im**2)
          x_in(i) = x(i)
      enddo
      sum = 0
      do m = 1, 38
        shift = (1/a0)*(((a0)**m))
        limit(m) = int(812./shift)
        sum = sum + limit(m) + 4
```

EXAMPLE FORTRAN 77 IMPLEMENTATION
Copyright 1993 Westinghouse Electric Corporation
All Rights Reserved

```
        step_size(m) = shift
      enddo
c     memorize wavelets
      grid = 0
      do m = 1, 38
        print *,'memorize ',m
        do n = 1, limit(m)+4
          grid = grid + 1
          do i = 1, N_1+4
            t = 1.0*i
            t = t/(a0**m) - (n-2)*b0
            h(i,grid) = (1.-t**2)*(exp(-0.5*(t**2)))/
            (sqrt(a0**m))
          enddo
        enddo
      enddo
c     Step 2. Forward Transform
      grid = 0
      do m = 1, 38
        print *,'forward ',m
        do n = 1, limit(m)+4
          grid = grid + 1
          do i = 1, N_1+4
            wt(n,m) = wt(n,m) + h(i,grid)*x(i)
          enddo
        enddo
      enddo
c     Step 3. Inverse Transform
      do i = 1, N_1+4
        x(i) = 0.0
      enddo
      do i = 1, N_1+4
        print *,'inverse',i
        grid = 0
        do m = 1, 38
          do n = 1, limit(m)+4
            grid = grid+1
            a00 = a0**m
            r = ((n-1)*(a00) - xoff)**2)/(a**2)
            r = r+((m*1.-yoff)**2)/(b**2)
            if(wt(n,m) .lt. wt_thresh)then
              if(r.le.1.) then
                x(i) = x(i) + wt(n,m)*h(i,grid)
              endif
            endif
            r = 0.
          enddo
        enddo
      enddo
c     test: subtract input signature from wavelet-filtered
c     signature to view residual
777   print *,'Enter x_norm->'
      read(*,*) x_norm
      sum = 0.
      do i = 1, N_1+4
        diff(i) = abs(x(i)) - x_norm*abs(x_in(i))
        sum = sum + diff(i)
      enddo
      print *,'sum=',sum
      print *,'try again?(y=1)(n=0)->'
      read(*,*) int_switch
      if(int_switch.eq.1)goto 777
c     endtest
      do i = 1, N_1+4
        f(i) = factor*x(i)/100. + 1000.
        print *,f(i)
      enddo
      call graph(f2048)
100       format(a)
200       format(e13.6)
      stop
```

Alternatively, the classifier of the present invention further comprises a comparator coupled to the separability filter for comparing the select inner product transform coefficients, which are passed by the separability filter, with an exemplar.

The exemplar is a stored array of coefficients representing a signature for a known target described above. Naturally, an exemplar may comprise a plurality of signatures from a known target or from a plurality of targets to enhance the versatility of the classifier.

The comparison between the select inner product transform coefficients and the exemplar indicates a recognition of the features of the target. Preferably, the comparator 92 performs a Pearson's r correlation between the extracted coefficients passed by the separability filter 88 and the exemplar.

To enhance the correlation by the comparator 92, the classifier of the present invention also performs self-alignment. For a given look by a radar, the features of a target in the received signal may not align in the input domain precisely with the features stored in the exemplar. Consequently, the comparator 92 may not obtain an optimal correlation and may not recognize the target. To alleviate this drawback, the comparator 92 of the present invention repeatedly shifts a delay variable of the select inner product transform coefficients received from the separability filter 88 to increase the correlation with an exemplar.

Due to the operations of the resolving means 40, the regionpass filter 72, and the separability filter 88, the computations performed by the comparator 92 are vastly reduced over conventional techniques and yield more accurate recognition of targets. First, by setting the scale-delay grid spacing at critical frame, the resolving means 40 minimizes the number of coefficients necessary to adequately represent the signal x(t). Second, by optimizing the size and location for the target region within the scale-grid plane, the regionpass filter 72 eliminates extraneous coefficients. Third, by extracting only the scale band 90 of coefficients where the separability among known targets is highest, the separability filter 88 improves the accuracy of recognition. Each of these techniques also decreases classifier dimensionality and computational intensity.

An actual reduction to practice of the classifier of this invention has demonstrated its performance enhancements. When compared with an equivalent baseline classifier, a wavelet mini-classifier exhibited an increased probability of correct classification for numerous looks of several targets. Both classifiers performed correlation with target exemplars using a limited search. For both classifiers, several looks of three target classes were aligned and summed non-coherently to form three exemplars.

Figure 11:
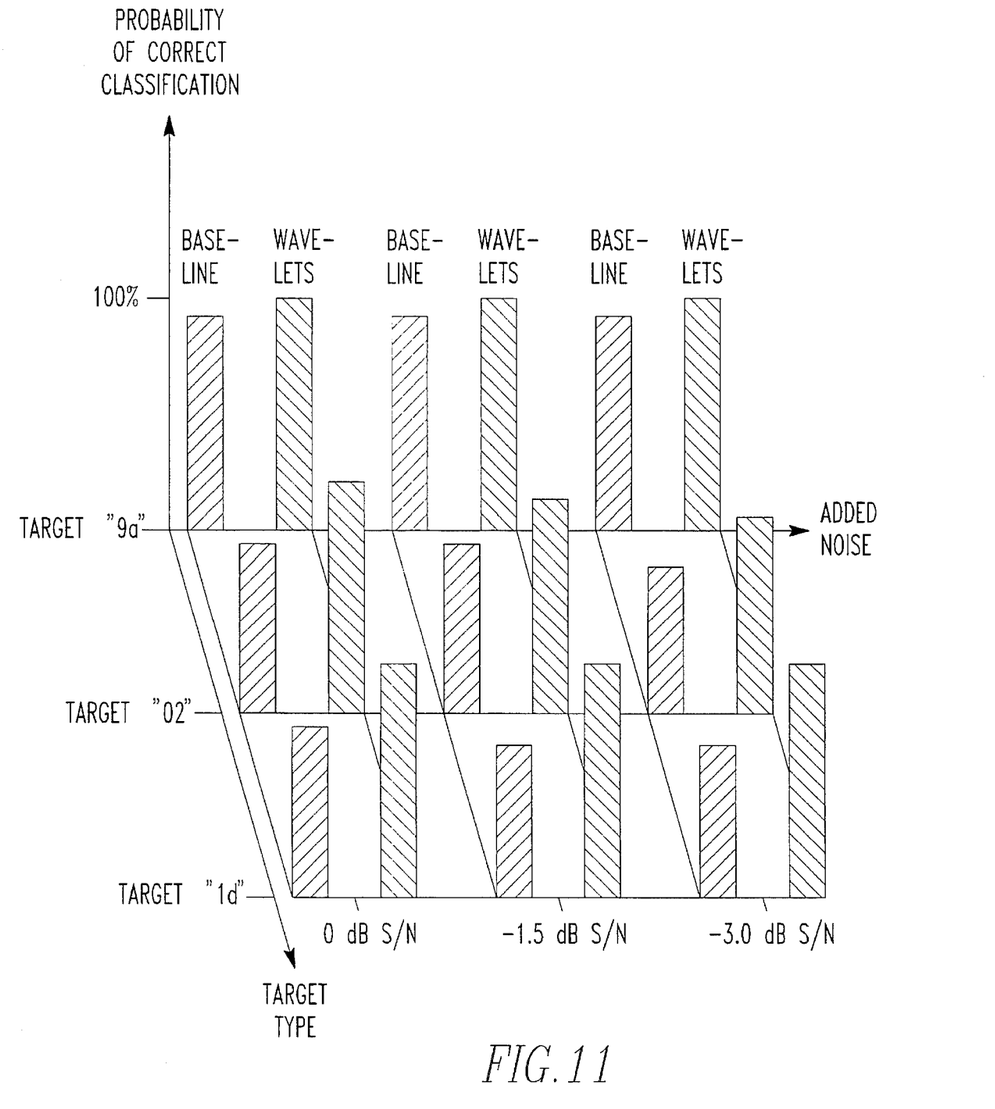
FIG. 11 is a plot of the results of an actual reduction to practice of the present invention as compared to a baseline classifier.

FIG. 11 illustrates the results of the comparison. For three target types ("9a", "02", "1d") the wavelets classifier had an increased probability of correct classification under all conditions of added noise.

Figure 12:
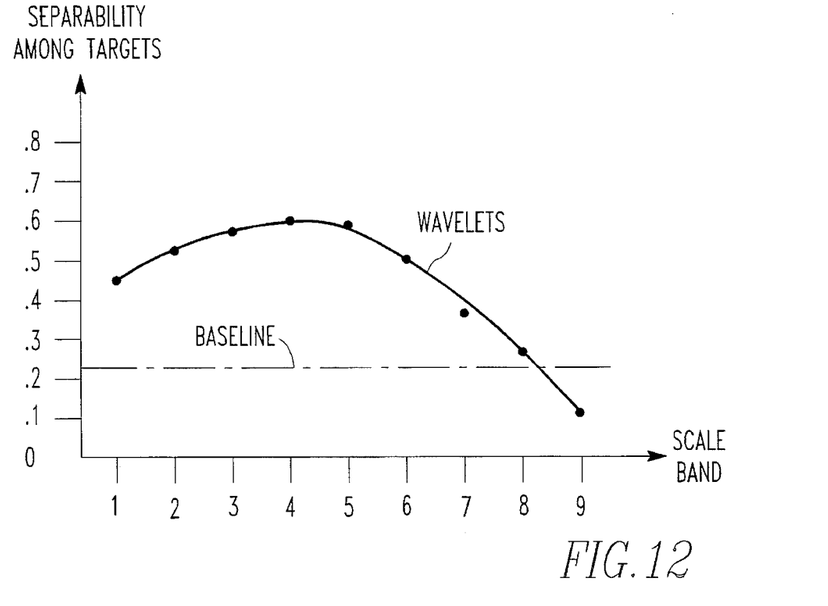
FIG. 12 is a plot of separability versus scale band for an actual reduction to practice of the present invention together with a plot of the constant separability performance of an equivalent baseline classifier.
Figure 13:
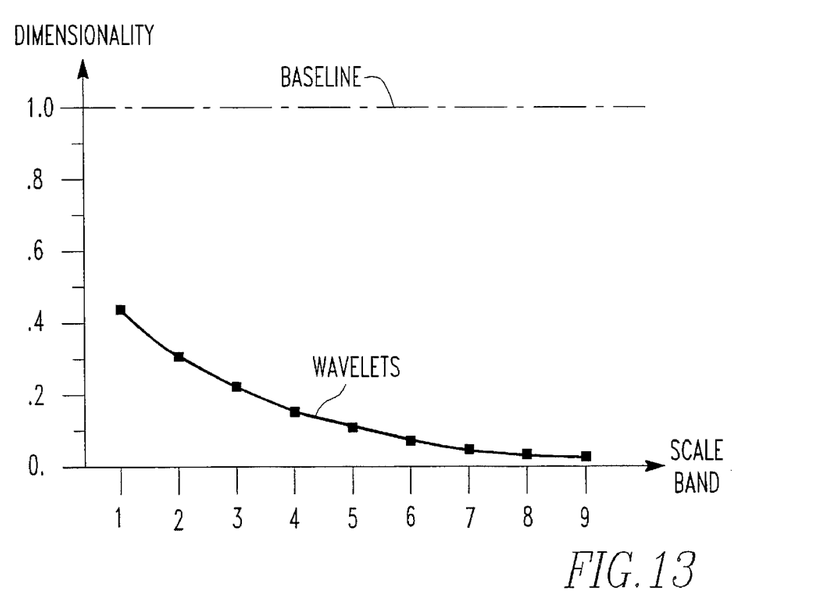
FIG. 13 is a plot of the dimensionality versus scale band for an actual reduction to practice of the present invention together with a plot of the constant dimensionality of an equivalent baseline classifier.

Referring to FIGS. 12 and 13, the implemented classifier of the present invention importantly exhibited an increased separability among known targets in scale bands also having decreased dimensionality, as compared to a baseline classifier. As FIG. 12 shows, a baseline classifier operating strictly in the time or frequency domain produced a constant separability of about 0.23. The separability from the wavelet classifier had a local maxima at the vertex of an approximately parabolic shape, with most instances exceeding the separability for the baseline classifier. For FIG. 13, the dimensionality for the wavelets classifier was a fraction of the baseline classifier. Note that the maximum separability of the wavelet classifier at the fourth scale band coincides with a decreased dimensionality compared to scale bands 1–3. This intersection of low dimensionality with high separability is an optimal configuration for real-time classifiers. This unique combination enables the present invention to recognize target features more accurately and with decreased computational intensity.

It will be apparent to those skilled in the art that various modifications and variations can be made to the present invention without departing from the spirit or scope of the present invention. For example, coefficients from several scale bands within the pass region may be combined to form a composite feature vector. Thus, it is intended that the present invention cover the modifications and variations of this invention provided they come within the scope of the appended claims and their equivalents.

What is claimed is:

1. A classifier for recognizing features of a target in a received signal, comprising:

means for selecting a prototype wavelet corresponding in amplitude and phase per unit of time to a portion of said received signal;

means for resolving said received signal onto a basis of wavelet functions in a wavelet domain by calculating inner product transform coefficients between said received signal and each of said wavelet functions, said wavelet functions corresponding to variations in scale and delay for said prototype wavelet, said variations in scale and delay exceeding a frame condition for said prototype wavelet and said basis, said frame condition enabling an inverse wavelet transform of said calculated inner product transform coefficients to converge on said received signal;

a regionpass filter for identifying a target region of said basis and for passing said inner product transform coefficients within said target region, said target region including said target features in the received signal;

a separability filter coupled to said regionpass filter for passing select inner product transform coefficients in said target region, said select inner product transform coefficients being a scale band within said target region and having a separability between known targets exceeding the separability in other scale bands within said target region, a scale band defined by a set of inner product transform coefficients having a common scale variable; and a comparator coupled to said separability filter for comparing said select inner product transform coefficients to an exemplar, said comparison indicating a recognition of said features of the target.

2. The classifier of claim 1, wherein said basis of wavelet functions is orthonormal.

3. The classifier of claim 1, wherein said prototype wavelet is bandpass limited, locally supported, and mean zero.

4. The classifier of claim 1, wherein said basis of wavelet functions is overcomplete.

5. The classifier of claim 4, wherein said overcomplete basis of wavelet functions is general frame.

6. The classifier of claim 5, wherein said frame condition is critical frame, said critical frame indicating the variation for scale and delay for said prototype wavelet where a number of said inner product calculations is a minimum for said inverse wavelet transform to converge.

7. The classifier of claim 6, wherein said critical frame for said prototype wavelet $h_{m,n}(t)$ occurs at $h_{m,n}(t)=(1/\sqrt{a_o^m})h(t/a_o^m - nb_o)$ when $a_o$ is a minimum for said inverse wavelet transform to converge, $b_o$ being a real constant, m and n being integers.

8. The classifier of claim 6, wherein said critical frame for said prototype wavelet is determined using a non-continuous function within a complement of a space of continuous functions within Hilbert space for said input signal.

9. The classifier of claim 8, wherein said non-continuous function within Hilbert space is a square wave.

10. The classifier of claim 1, wherein said comparator shifts a delay variable of said select inner product transform coefficients to increase a correlation between said select inner product transform coefficients and said exemplar.

11. The classifier of claim 1, wherein said comparison is a Pearson's r correlation.

12. A preclassifier for discriminating features of a target in a received signal, comprising:

means for selecting a prototype wavelet corresponding in amplitude and phase per unit of time to a portion of said received signal;

means for resolving said received signal onto a basis of wavelet functions in a wavelet domain by calculating inner product transform coefficients between said received signal and each of said wavelet functions, said wavelet functions corresponding to variations in scale and delay for said prototype wavelet, said variations in scale and delay exceeding a frame condition for said prototype wavelet and said basis, said frame condition enabling an inverse wavelet transform of said calculated inner product transform coefficients to converge on said received signal;

a regionpass filter for identifying a target region of said basis and for passing said inner product transform coefficients within said target region, said target region including said target features in the received signal; and a separability filter coupled to said regionpass filter for passing select inner product transform coefficients in said target region, said select inner product transform coefficients being a scale band within said target region and having a separability between known targets exceeding the separability in other scale bands within said target region, a scale band defined by a set of inner product transform coefficients having a common scale variable.

13. The preclassifier of claim 12, wherein said basis of wavelet functions is orthonormal.

14. The preclassifier of claim 12, wherein said prototype wavelet is bandpass limited, locally supported, and mean zero.

15. The preclassifier of claim 12, wherein said basis of wavelet functions is overcomplete.

16. The preclassifier of claim 15, wherein said overcomplete basis of wavelet functions is general frame.

17. The preclassifier of claim 16, wherein said frame condition is critical frame, said critical frame indicating the variation for scale and delay for said prototype wavelet where a number of said inner product calculations is a minimum for said inverse wavelet transform to converge.

18. The preclassifier of claim 17, wherein said critical frame for said prototype wavelet $h_{m,n}(t)$ occurs at $h_m,n(t)=(1/\sqrt{a_o^m})h(t/a_o^m-nb_o)$ when $a_o$ is a minimum for said inverse wavelet transform to converge, $b_o$ being a real constant, m and n being integers.

19. The preclassifier of claim 17, wherein said critical frame for said prototype wavelet is determined using a non-continuous function within a complement of a space of continuous functions within Hilbert space for said input signal.

20. The preclassifier of claim 19, wherein said non-continuous function within Hilbert space is a square wave.

21. A filter for passing select inner product transform coefficients from a resolution of a received signal onto a basis of wavelet functions in a wavelet domain, said wavelet functions corresponding to variations in scale and delay for a prototype wavelet, said select inner product transform coefficients including features of a received target, comprising:

a regionpass filter for identifying a target region of said basis and for passing said inner product transform coefficients within said target region, said target region including said features of the received target; and a separability filter coupled to said regionpass filter for passing select inner product transform coefficients in said target region, said select inner product transform coefficients being a scale band within said target region and having a separability between known targets exceeding the separability in other scale bands within said target region, a scale band defined by a set of inner product transform coefficients having a common scale variable.

22. The filter of claim 21, further comprising an amplitude filter coupled to said separability filter for passing a portion of said select inner product transform coefficients, said portion having an amplitude exceeding a predetermined value.

23. The filter of claim 21, wherein said regionpass filter identifies a target region by correlating said inner product transform coefficients occurring inside a sample region in a scale-delay plane of said wavelet domain with said inner product transform coefficients occurring outside said sample region.

24. The filter of claim 23, wherein said regionpass filter adjusts a size of said sample region to decrease said correlation.

25. The filter of claim 23, wherein said regionpass filter shifts a location of said sample region in said scale-delay plane to decrease said correlation.

26. The filter of claim 23, wherein said correlation is a Pearson's r correlation.

27. The filter of claim 23, wherein said sample region has an ellipsoidal shape.

28. A method for classifying features of a target in a received signal, comprising the steps of:

(a) selecting a prototype wavelet corresponding in amplitude and phase per unit of time to a portion of said received signal;

(b) resolving said received signal onto a basis of wavelet functions in a wavelet domain by calculating inner product transform coefficients between said received signal and each of said wavelet functions, said wavelet functions corresponding to variations in scale and delay for said prototype wavelet, said variations in scale and delay exceeding a frame condition for said prototype wavelet and said basis, said frame condition enabling an inverse wavelet transform of said calculated inner product transform coefficients to converge on said received signal;

(c) identifying a target region of said basis, said target region including said target features in the received signal;

(d) passing said inner product transform coefficients within said target region;

(e) passing select inner product transform coefficients in said target region, said select inner product transform coefficients being a scale band within said target region and having a separability between known targets exceeding the separability in other scale bands within said target region, a scale band defined by a set of inner product transform coefficients having a common scale variable; and (f) comparing said select inner product transform coefficients to an exemplar, said comparison indicating a recognition of said features of the target.

29. A method for preclassifying features of a target in a received signal, comprising the steps of:

(a) selecting a prototype wavelet corresponding in amplitude per unit of time to a portion of said received signal;

(b) resolving said received signal onto a basis of wavelet functions in a wavelet domain by calculating inner product transform coefficients between said received signal and each of said wavelet functions, said wavelet functions corresponding to variations in scale and delay for said prototype wavelet, said variations in scale and delay exceeding a frame condition for said prototype wavelet and said basis, said frame condition enabling an inverse wavelet transform of said calculated inner product transform coefficients to converge on said received signal;

(c) identifying a target region of said basis, said target region including said target features in the received signal;

(d) passing said inner product transform coefficients within said target region; and (e) passing select inner product transform coefficients in said target region, said select inner product transform coefficients being a scale band within said target region and having a separability between known targets exceeding the separability in other scale bands within said target region, a scale band defined by a set of inner product transform coefficients having a common scale variable.

30. A method for passing select inner product transform coefficients from a resolution of a received signal onto a basis of wavelet functions in a wavelet domain, said wavelet functions corresponding to variations in scale and delay for a prototype wavelet, said select inner product transform coefficients including features of a received target, comprising the steps of:

(a) identifying a target region of said basis, said target region including said received target features; and (b) passing select inner product transform coefficients in said target region, said select inner product transform coefficients being a scale band within said target region and having a separability between known targets exceeding the separability in other scale bands within said target region, a scale band defined by a set of inner product transform coefficients having a common scale variable.

31. The method of passing select inner product transform coefficients of claim 30, further comprising the step of:

(c) filtering a portion of said select inner product transform coefficients having an amplitude less than a predetermined value.

32. The method of passing select inner product transform coefficients of claim 30, wherein said identifying step comprises the steps of:

(i) selecting a sample region in a scale-delay plane of said wavelet domain;

(ii) correlating said inner product transform coefficients occurring inside said sample region with said inner product transform coefficients occurring outside said sample region;

(iii) adjusting a size of said sample region to decrease said correlation; and (iv) shifting a location of said sample region in said scale-delay plane to decrease said correlation.

* * * * *